United States Patent
Sugita et al.

(10) Patent No.: US 7,042,660 B2
(45) Date of Patent: May 9, 2006

(54) LENS BARREL HOLDING APPARATUS, LENS BARREL AND CAMERA SYSTEM

(75) Inventors: Jun Sugita, Sagamihara (JP); Mitsuru Shinohara, Hokuto (JP); Shigeki Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/044,818

(22) Filed: Jan. 26, 2005

(65) Prior Publication Data

US 2005/0237635 A1   Oct. 27, 2005

(30) Foreign Application Priority Data

Jan. 28, 2004   (JP)   ............... 2004-020568

(51) Int. Cl.
*G02B 7/02*   (2006.01)
*G03B 17/00*  (2006.01)
*H04N 5/225*  (2006.01)

(52) U.S. Cl. ............... 359/818; 359/819; 359/822; 396/529; 396/530; 348/375

(58) Field of Classification Search ............... 359/811, 359/818, 819, 822, 827; 396/6, 80, 215, 396/546, 529, 530, 532; 348/357, 335, 375
See application file for complete search history.

(56) References Cited

U.S. PATENT DOCUMENTS 3,395,628 A * 8/1968 Kautz et al. ............... 396/546
3,547,016 A * 12/1970 Rentschler ............... 396/215
5,164,757 A * 11/1992 Nomura ............... 396/80

FOREIGN PATENT DOCUMENTS

| JP | 5-249356 | 9/1993 |
| JP | 5-249357 | 9/1993 |
| JP | 2001-059989 | 3/2001 |
| JP | 2003-337275 | 11/2003 |

* cited by examiner

*Primary Examiner*—Loha Ben
(74) *Attorney, Agent, or Firm*—Morgan & Finnegan, LLP

(57) ABSTRACT

A lens barrel holding apparatus includes a first holding member, a second holding member attached to the first holding member in an openable/closable manner for fastening a lens barrel in cooperation with the first holding member to hold the lens barrel and a fastening mechanism for applying a force for fastening the lens barrel, to the second holding member. The fastening mechanism includes an engagement surface provided on the second holding member and a fastening member provided on the first holding member, adapted to move straightly toward/away from the engagement surface, and having a contact surface that can be in contact with the engagement surface. At least one of the contact surface and the engagement surface is slanted with respect to the movement direction of the fastening member.

7 Claims, 6 Drawing Sheets

LENS BARREL HOLDING APPARATUS, LENS BARREL AND CAMERA SYSTEM

BACKGROUND OF THE INVENTION

1. Field of the Invention

The present invention relates to a lens barrel holding apparatus used for mounting a lens barrel on a tripod, a lens barrel held (or supported) by the lens barrel holding apparatus and a camera system.

2. Related Background Art

There are the following types of lens barrel holding apparatuses used as a mounting pedestal for mounting the barrel of an interchangeable lens on a tripod.

(A) A lens barrel holding apparatus in which a ring shaped barrel mount part surrounding the lens barrel is fastened with screws disposed in radial directions with respect to the optical axis of the lens barrel directly or with a cushioning member between.

(B) A lens barrel holding apparatus in which a slit is formed on a portion of a ring shaped holding member and the opposed portions thereof that face the slit are fastened by a screw with a required fastening force to hold the lens barrel.

(C) A lens barrel holding apparatus in which two arc-shaped holding members are pivotably joined at their one ends so that the holding members can be opened to receive the lens barrel inside the holding members and fastened with a clamp screw to hold the lens barrel. On the occasion of the hand-held shooting, it is possible to dismount the lens barrel form the lens barrel holding apparatus by loosening the clamp screw.

(D) A lens barrel holding apparatus in which a ring portion for holding the lens barrel and for adjusting its revolving position and a pedestal portion to be fixed on a tripod are detachable.

(E) A lens barrel holding apparatus in which two arc-shaped holding members are pivotably joined at their one ends so that the holding members are opened to receive the lens barrel inside the holding members. In addition, the lens barrel is adapted to be securely held by turning an eccentric cam provided on one of the holding members while it is in contact with a wall of the other holding member.

However, the above-described lens barrel holding apparatus (A) suffers from the following disadvantages (a) to (d).

(a) Since a heavy load is applied on the position on the lens barrel (or the barrel mount part) at which the screw impinges, the lens barrel can be easily deformed. Therefore, it is necessary to reinforce the lens barrel that is to be mounted on the lens barrel mount part.

(b) The load of the lens barrel is applied along the line connecting a screw and another screw disposed at the position opposite to that screw with respect to the optical axis, and backlash is likely to be produced in the direction perpendicular to this line.

(c) If the screw is not tightened sufficiently, the lens barrel will incline relative to the holding apparatus.

(d) When the lens barrel is to be detached from the lens barrel mount part, it is necessary to take out the lens barrel from the barrel mount part after separating the lens barrel and the camera, since the barrel mount part has an integral ring-like shape.

In the case of the above-described lens holding apparatus (B), although it is free from the load concentration and other disadvantages thanks to the slit structure, it still suffers from the above problem (d) upon detaching the lens barrel, since the holding member is of a ring-like shape.

Furthermore, in the case of the above-described lens barrel holding apparatus (C), it is necessary to turn the clamp screw a significant number of times upon attaching/detaching the lens barrel. Thus, the operability is bad, and the lens barrel cannot be attached or detached quickly.

In the case of the above-described lens barrel holding apparatus (D), since the lens barrel is secured by tightening the clamp screw serving as means for fixing the rotational position of the lens barrel, the problems same as problems (a) to (c) of lens barrel holding apparatus (A) arise.

In the case of the above-described lens barrel holding apparatus (E), since the two holding members are drawn in by the eccentric cam, it is necessary to generate a sufficient lens barrel securing force while rotating the eccentric cam to a position at which a sufficient frictional force is produced so as to prevent the eccentric cam from being returned backwardly by the load of the lens barrel held. Accordingly, it is required to achieve a significant fastening force of the holding members and a high machining precision that enables alignment of the rotational position of the eccentric cam. Furthermore, durability of the parts is also required so that the above-described setting will not change with the lapse of time. In addition, if the fastening force of the holding members is weak, the aforementioned problems (b) and (c) arise inevitably.

SUMMARY OF THE INVENTION

To achieve the above-described object, a lens barrel holding apparatus according to the present invention includes a first holding member, a second holding member attached to the first holding member in an openable/closable manner for fastening a lens barrel in cooperation with the first holding member to hold the lens barrel and a fastening mechanism for applying a force for fastening the lens barrel, to said second holding member. The fastening mechanism includes an engagement surface provided on the second holding member and a fastening member provided on the first holding member, adapted to translate toward/away from the engagement surface, and having a contact surface that can be in contact with the engagement surface. At least one of the contact surface and the engagement surface is slanted with respect to the translation direction of the fastening member.

DESCRIPTION OF THE PREFERRED EMBODIMENTS

In the following, embodiments of the present invention will be described with reference to the drawings.

(First Embodiment)

Figure 1:
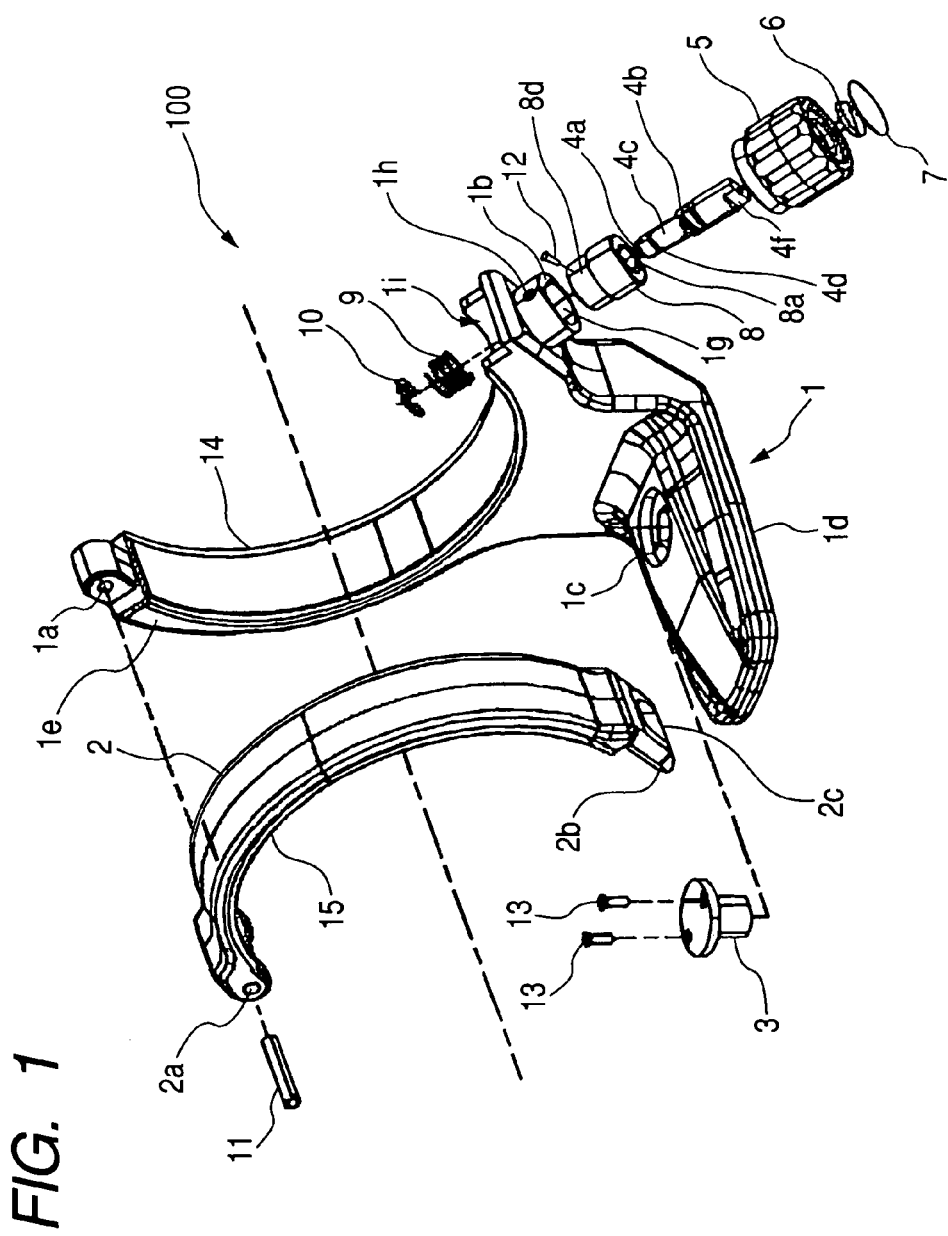
FIG. 1 is an exploded perspective view showing a mounting pedestal according to first embodiment of the present invention.
Figure 2:
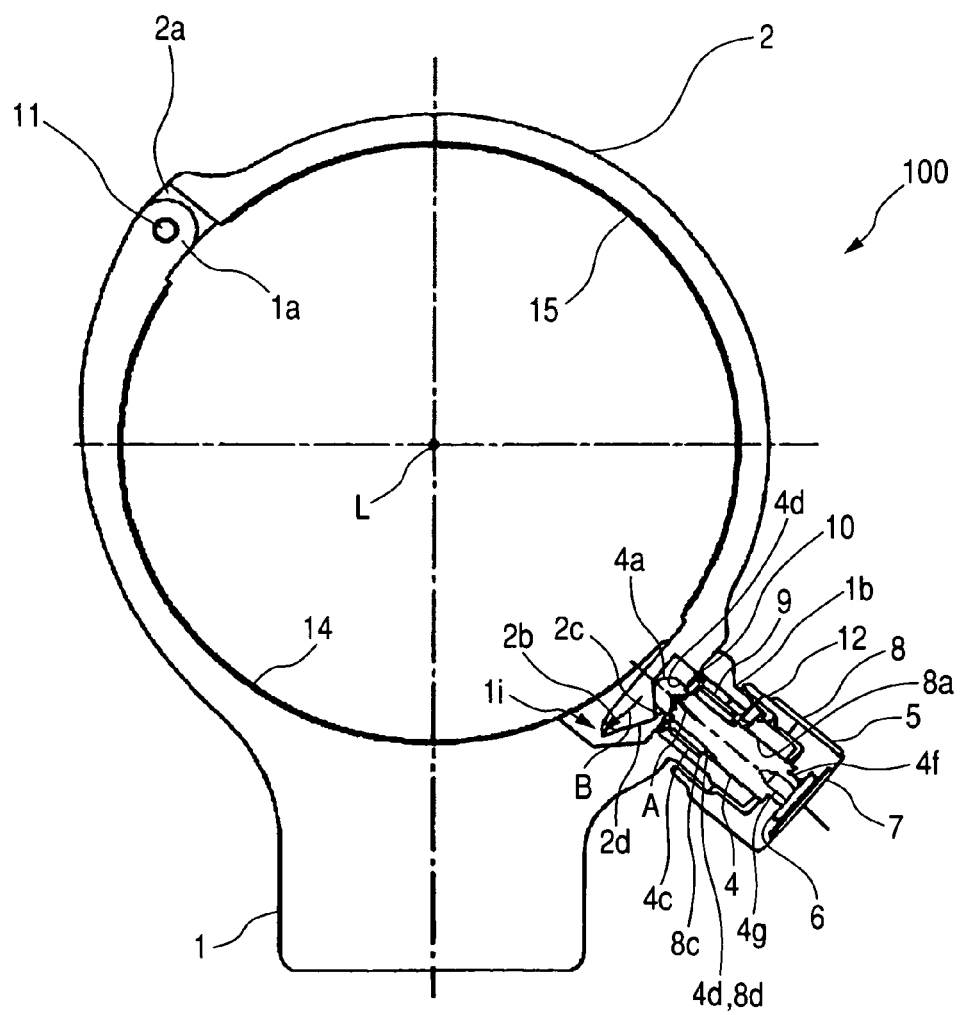
FIG. 2 is a cross sectional view showing the mounting pedestal according to the first embodiment.

FIG. 1 is an exploded view showing a mounting pedestal (or a lens barrel holding apparatus) of a first embodiment of the present invention. FIG. 2 is a cross sectional view of the mounting pedestal.

Figure 4:
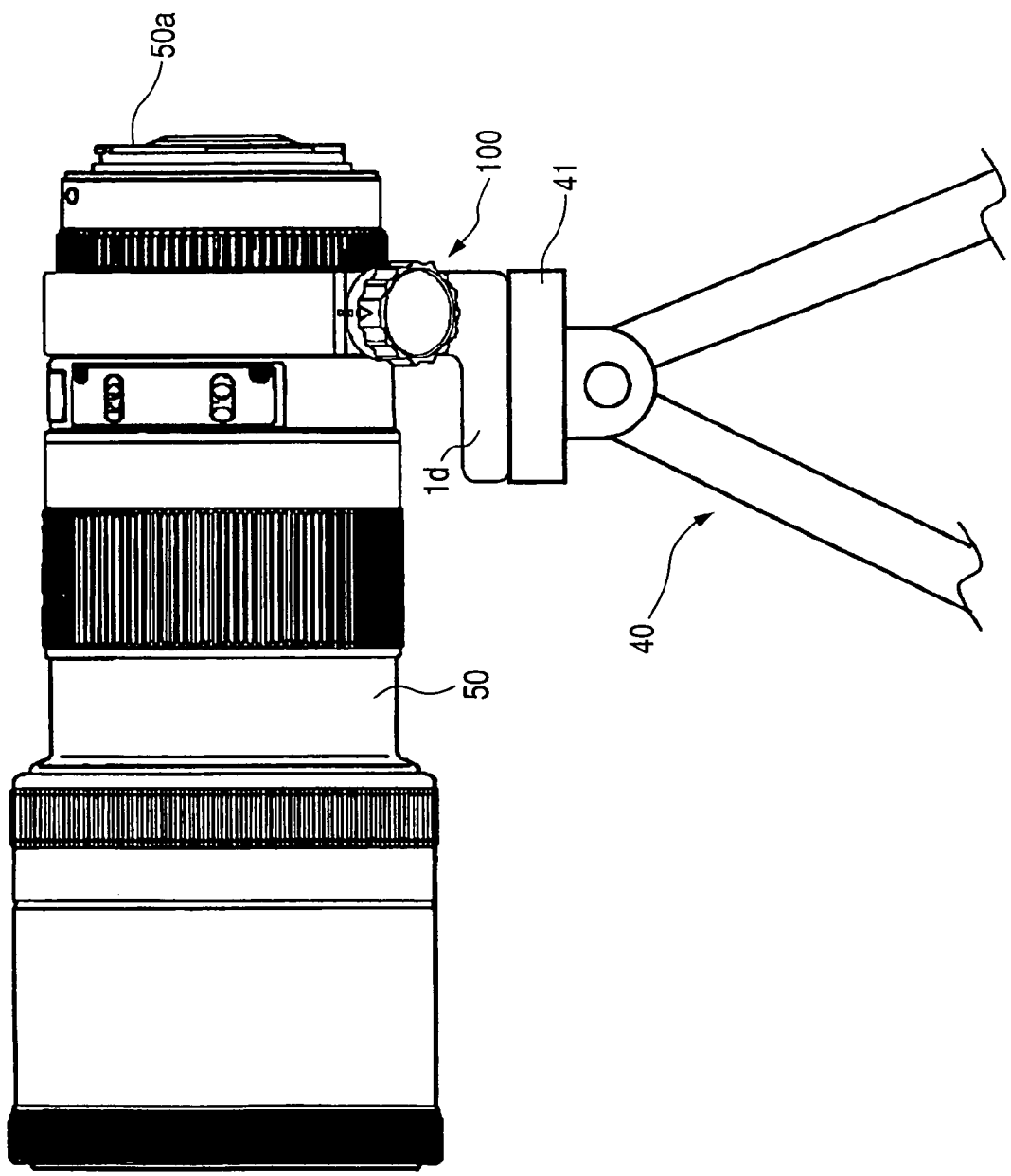
FIG. 4 illustrates how the mounting pedestal according to the first embodiment is used.

FIG. 4 shows a state in which a lens barrel is fixedly mounted on a tripod using the aforementioned mounting pedestal. In FIG. 4, reference numeral 40 designates a tripod, and reference numeral 41 designates a camera platform provided on the tripod. A mounting pedestal 100 is placed on the top face of the camera platform 41. The pedestal portion 1d of the mounting pedestal 100 is secured to the camera platform 41 with a securing screw that is not shown in the drawings. A lens barrel 50 is held by the mounting pedestal 100. In addition, a single lens reflex camera is attached to the mount portion 50a of the lens barrel 50 held by the mounting pedestal 100, though the camera is not illustrated in the drawing.

In FIGS. 1 and 2, reference numeral 1 designates a pedestal body serving as the first holding member. The pedestal body 1 has a pedestal portion 1d and a fixed holder portion 1e having a circular arc shape. A pedestal hinge portion 1a is provided at one end of the fixed holder portion 1e. At the other end of the fixed holder portion 1e, there is provided a fastening mechanism holding portion 1b for holding the manipulation portion of a fastening mechanism that will be described later. As shown in FIG. 2, the fastening mechanism holding portion 1b is radially outwardly offset from the inner circumferential surface of the fixed holder portion 1e. The groove space formed by this offset serves as a receiving portion 1i in which an engagement portion 2b of a fastening holder member 2 to be described later is to be received.

Between the pedestal hinge portion 1a and the fastening mechanism holding portion 1b on the inner circumferential surface of the fixed holder portion 1e, a band cloth (flocked cloth) 14 is attached. The band cloth 14 is designed to be in contact with the outer circumferential surface of the lens barrel 50 to prevent slippage (rotation) of the lens barrel 50 relative to the fixed holder portion 1e from occurring or preventing the outer circumferential surface of the lens barrel 50 from being scratched.

Reference numeral 2 designates the fastening holder member serving as the second holding member. The fastening holder member 2 has a circular arc shape. The fastening holder member 2 has a fastening hinge portion 2a formed at one end thereof. The fastening hinge portion 2a is attached to the pedestal hinge portion 1a with a press-fit pin 11 so that it can swing between open and close positions. At the other end on the outer circumferential surface of the fastening holder member 2, an engagement portion 2b in the form of a projection is formed. The engagement portion 2b constitutes a part of the fastening mechanism. In the engagement portion 2b, a slanted surface (or an engaging surface) 2c is provided in the inner side with respect to the longitudinal direction of the circular arc, and a curved surface 2d that is convex toward the radially outer side is provided in the outer side with respect to the longitudinal direction of the circular arc. The slanted surface 2c is designed to be in contact with a conical portion 4a formed at the tip end of a fastening shaft member 4 that will be described later so as to receive a fastening force from the circumferential surface (contact surface) of the conical portion 4a.

Between the fastening hinge portion 2a and the engagement portion 2b on the inner circumferential surface of the fastening holder member 2, a band cloth 15, the same as the band cloth 14, is attached.

As shown in FIG. 2, the fixed holder member 1e of the pedestal body 1 extends over the range of approximately 180° from a lower right position to an upper left position by way of the position just beneath the lens barrel 50 holding center position L (i.e. the position substantially coinciding with the optical axis of the lens barrel 50) with the center being at the center position L. On the other hand, the fastening holder member 2 extends, in its closing state on the pedestal body 1, over the range of 180° from the upper left position to the lower right position by way of the position just above the center position L.

In FIG. 1, reference numeral 3 designates a screw receiving member, which is inserted in the receiving portion 1c formed on the pedestal portion 1d of the pedestal body 1 and fixed to the pedestal portion 1d with screws 13. Inside the screw receiving member 3, a female threaded portion (not shown) that opens downwardly is formed. A fixing screw (male screw) inserted from the bottom side of the camera platform 41 of the tripod 40 shown in FIG. 4 is screwed into the female threaded portion. Thus, the pedestal body 1 is fixedly mounted on the camera platform 41.

Next, the structure of the manipulation portion of the fastening mechanism provided on the pedestal body 1 will be described. As shown in FIGS. 1 and 2, the fastening shaft member 4 serving as the fastening member has a key portion 4f formed at the rear end thereof, to which a fastening knob 5 is joined via the key so that the knob 5 can rotate integrally with it. A male screw 6 is inserted in the recessed portion (not assigned with any reference numeral) formed on the head face of the fastening knob 5, and the male screw 6 is screwed into a female threaded portion 4g formed on the key portion 4f. Thus, the fastening knob 5 is fixed to the fastening shaft member 4. In addition, a disk-shaped cover plate 7 is attached to the head face of the fastening knob 5 to cover the head of the male screw 6.

At a mid position along the axial direction on the fastening shaft member 4, there is provided a male threaded portion 4b having a circumferential length corresponding to several turns (e.g. three turns) of the fastening shaft member 4. The portion of the fastening shaft member 4 on the tip end side of the male threaded portion 4b is formed into a small diameter portion 4c having a stepped-down diameter. At the tip end of the small diameter portion 4c, a conical portion 4a whose diameter decreases toward the tip end is provided. In other words, the conical portion 4a has a conical contact surface inclined relative to the axial direction all along its circumference. In addition, at a mid position of the small diameter portion 4c, a groove 4d is formed.

The fastening shaft member 4 having the above-described structure is inserted into a through hole portion 8a formed inside the shaft retaining member 8. On the tip end side area on the inner circumferential surface of the through hole portion 8a, a female threaded portion 8b, to which the male threaded portion 4b of the fastening shaft member 4 can engage, is formed. The fastening shaft member 4 can be translated along its axial direction or moved toward/away from the engagement surface 2c of the fastening holder member 2 by rotating the fastening shaft member 4 to screw the male threaded portion 4b into the female threaded portion 8b.

A coil spring 9 is set on the outer circumference of the small diameter portion 4c of the fastening shaft member 4. The rear end of the coil spring 9 abuts a stepped portion 8c (i.e. the portion having a stepped-up inner diameter larger than the through hole portion 8a) formed in the tip end side of the female threaded portion 8b on the inner circumference of the shaft retaining member 8. Furthermore, an E-washer 10 is fitted in the groove 4d of the fastening shaft member 4. The front end of the coil spring 9, which is compressed to some extent, abuts the E-washer 10. Thus, the fastening shaft member 4 is assembled to the shaft retaining member 8 in the state biased toward the tip end direction.

The shaft retaining member 8 to which the fastening shaft member 4 has been assembled as above is inserted into a through hole portion 1g formed inside the fastening mechanism holding portion 1b of the pedestal body 1. Then, a screw 12 inserted in a side hole 1h of the fastening mechanism holding portion 1b is tightly screwed into a female threaded portion 8d formed on the side surface of the shaft retaining member 8, so that the shaft retaining member 8 (that is, the manipulation portion) is secured to the fastening mechanism holding portion 1b (or the pedestal body 1).

In the following, a process of attaching/detaching the lens barrel 50 (see FIG. 4) to/from the mounting pedestal 100 having the above-described structure will be described.

Firstly, a description will be made of the process of attaching the lens barrel 50 to the mounting pedestal 100. In the following description, it is assumed that the engagement portion 2b of the fastening holder member 2 has been received in the receiving portion 1i formed in the pedestal body 1, the male threaded portion 4b of the fastening shaft member 4 has been engaging the female threaded portion 8b of the shaft retaining member 8, and the conical portion 4a of the fastening shaft member 4 has been in contact with the slanted surface 2c of the engagement portion 2b, as shown in FIG. 2.

As a preparatory operation for attaching, the fastening knob 5 is turned in the anti-clockwise direction so as to turn the fastening shaft member 4 in the same direction to disengage the connection of the male threaded portion 4b and the female threaded portion 8b. In this state, the conical portion 4a of the fastening shaft member 4 is still kept in contact with the slanted surface 2c of the engagement portion 2b of the fastening holder member 2 with a measure of force thanks to the biasing force of the coil spring 9, so that dislocation of the engagement portion 2b from the receiving portion 1i (in other words, the swing movement in the opening direction of the fastening holder member 2 relative to the pedestal body 1) is prevented, as will be described later. The position of the fastening shaft member 4 in this state will be referred to as the initial position hereinafter.

In view of the above, the fastening knob 5 is pulled radially outward direction of the mounting pedestal 100 (i.e. the direction toward the rear end of the fastening shaft member 4, which will be simply referred to as the outward direction hereinafter) to retract the conical portion 4a from the slanted surface 2c, and then the fastening holder member 2 is swung in the opening direction relative to the pedestal body 1. In connection with this, if the pulling operation of the fastening knob 5 is released, the fastening shaft member 4 is returned to its initial position by the biasing force of the coil spring 9.

After the fastening holder member 2 has been opened as above, the lens barrel 50 is placed on the fixed holder portion 1e of the pedestal body 1. Subsequently, the fastening holder member 2 is closed, and the engagement portion 2b is inserted into the receiving portion 1i of the pedestal body 1. During this operation, the fastening knob 5 may be kept pulled outwardly in order for the engagement portion 2b to be prevented from being in contact with the conical portion 4a of the fastening shaft member 4, or alternatively, the engagement portion 2b may be pushed into the receiving portion 1i while pushing the conical portion 4a of the fastening shaft member 4 outwardly by means of the curved surface 2d provided at the side opposite to the slanted surface 2c on the engagement portion 2b. In the state in which the engagement portion 2b is received in the receiving portion 1i and the fastening shaft member 4 is at the initial position, the conical portion 4a of the fastening shaft member 4 is in contact with the slanted surface 2c of the engagement portion 2b by virtue of the biasing force of the coil spring 9. In this state, the lens barrel 50 is fastened by such a fastening force with which backlash of the lens barrel 50 is eliminated but the lens barrel 50 can be rotated about its optical axis L. Accordingly, it can be turned to a desired rotational position about the optical axis L.

When subsequently the fastening knob 5 is turned in the clockwise direction, the male threaded portion 4b of the fastening shaft member 4 is brought into engagement with the female threaded portion 8b of the shaft retaining member 8, and the fastening shaft member 4 translates from the initial position toward the tip end direction (i.e. radially inward direction of the mounting pedestal 100 or the direction indicated by arrow A in FIG. 2). With this operation, the conical portion 4a of the fastening shaft member 4 slides on the slanted surface 2c of the engagement portion 2b of the fastening holder member 2 while pressing the slanted surface 2c in the direction indicated by arrow B in FIG. 2. Thus, a force fastening the lens barrel 50 in cooperation with the fixed holder portion 1e will be exerted on the fastening holder member 2. In another word, the inner diameter of the fixed holder portion 1e and the fastening holder member 2 will be reduced.

The operation of turning the fastening knob 5 should be stopped at the time when the lens barrel 50 is fastened without backlash (which state will be referred to as the fastening completion state hereinafter). As per the above, the lens barrel 50 can be attached to the mounting pedestal steadily by the above-described simple process.

In this embodiment, even if one or both of the conical portion 4a and the slanted surface 2c of the engagement portion 2b are worn with the sliding of the conical portion 4a on the slanted surface 2c, it is possible to always generate an appropriate fastening force by adjusting translation amount of the fastening shaft member 4. Therefore, a mounting pedestal having high durability against the lens barrel 50 attaching/detaching operations can be realized.

Next, a description will be made of the case where the lens barrel 50 is detached from the mounting pedestal 100. The detaching operation is similar to the process of the above-described preparatory operation upon attaching the lens barrel. Firstly, the fastening knob 5 is turned in the anti-clockwise direction to disengage the connection of the male threaded portion 4b and the female threaded portion 8b. Subsequently, the fastening knob 5 is pulled outwardly, and the fastening holder member 2 is opened from the pedestal body 1. Then, the lens barrel 50 is detached from the fixed holder portion 1e of the pedestal body 1.

Figure 3:
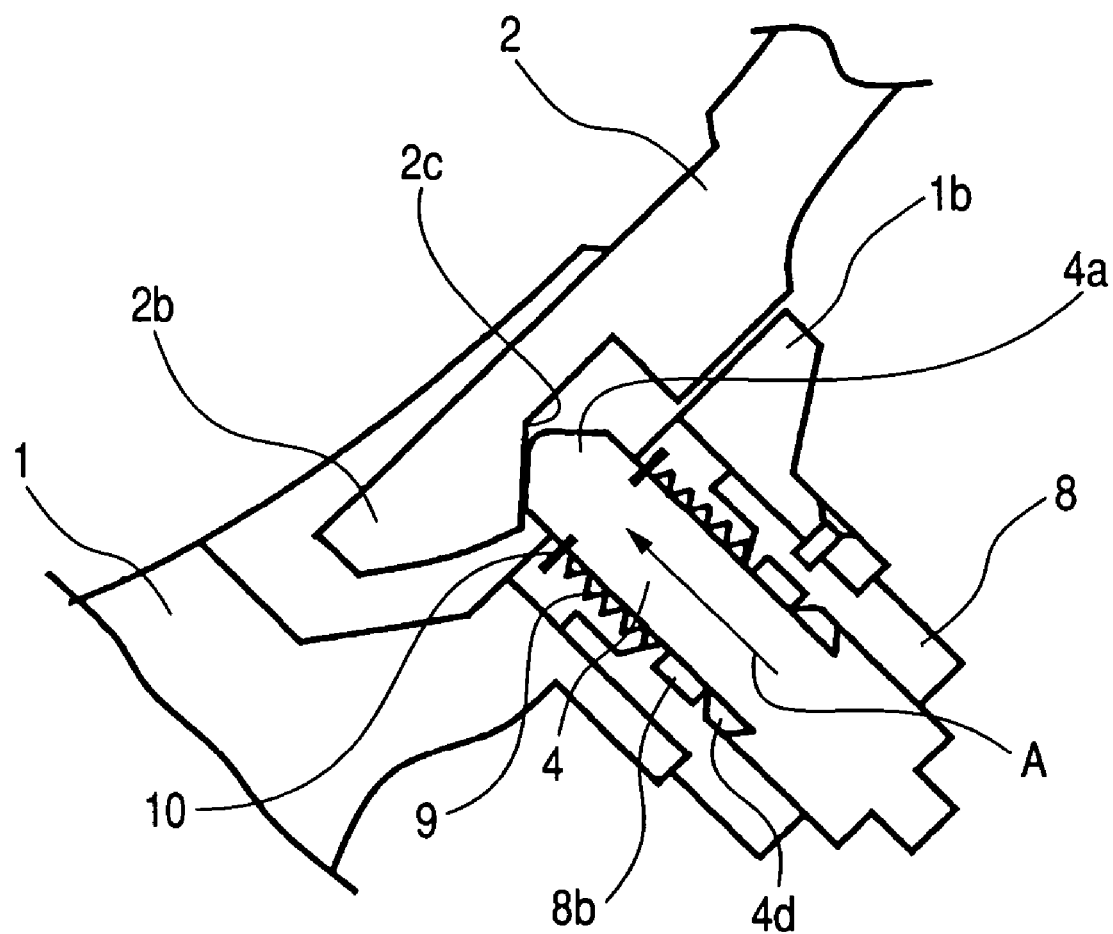
FIG. 3 is an enlarged view showing a portion of the mounting pedestal according to the first embodiment.

Here, the state (the initial state) at the time when male threaded portion 4b and the female threaded portion 8b are disengaged will be described with reference to FIG. 3. FIG. 3 shows only a portion including the fastening holder member 4 and the engagement portion 2a, and the illustration of the fastening knob 5 is omitted.

As shown in FIG. 3, in the initial state, the conical portion 4a of the fastening shaft member 4 is in contact with a more outside position on the slanted surface 2c of the engagement portion 2b of the fastening holder member 2 than in the fastening completion state. In this initial state, although the lens barrel 50 fastening force acting on the fastening holder member 2 is a little weaker than in the fastening completion state, the coil spring 9 is more compressed than in the fastening completion state, and so the biasing force exerted on the fastening shaft member 4 by the coil spring 9 toward the tip end direction (indicated by arrow A in FIG. 3) is large.

Therefore, even though the male threaded portion 4b and the female threaded portion 8b of the shaft retaining member 8 are not in engagement, the fastening shaft member 4 presses the engagement portion 2b (or the slanted surface 2c) of the fastening holder member 2 with a moderately strong force. Accordingly, it is not possible to open the fastening holder member 2 from the pedestal body 1 unless the engagement portion 2b is pulled out with a force overcoming that force in the opening direction. Thus, it is possible to avoid the situation that the lens barrel 50 is accidentally dislocated from the mounting pedestal during an operation of dismounting the lens barrel 50 (in the state in which the male threaded portion 4b and the female threaded portion 8b are out of engagement). In this state, the lens barrel 50 is fastened by such a fastening force with which backlash of the lens barrel 50 is eliminated but the lens barrel 50 can be rotated about its optical axis L. Accordingly, it can be rotated to a desired rotational position about the optical axis L.

In this embodiment, the fastening shaft member 4 and the fastening knob 5, the shaft retaining member 8 and the fastening mechanism holding portion 1b, and the pedestal portion 1d and the screw receiving member 3 are respectively constructed as separate members. But each of these paired parts may be constructed as an integral part.

(Second Embodiment)

Figure 5:
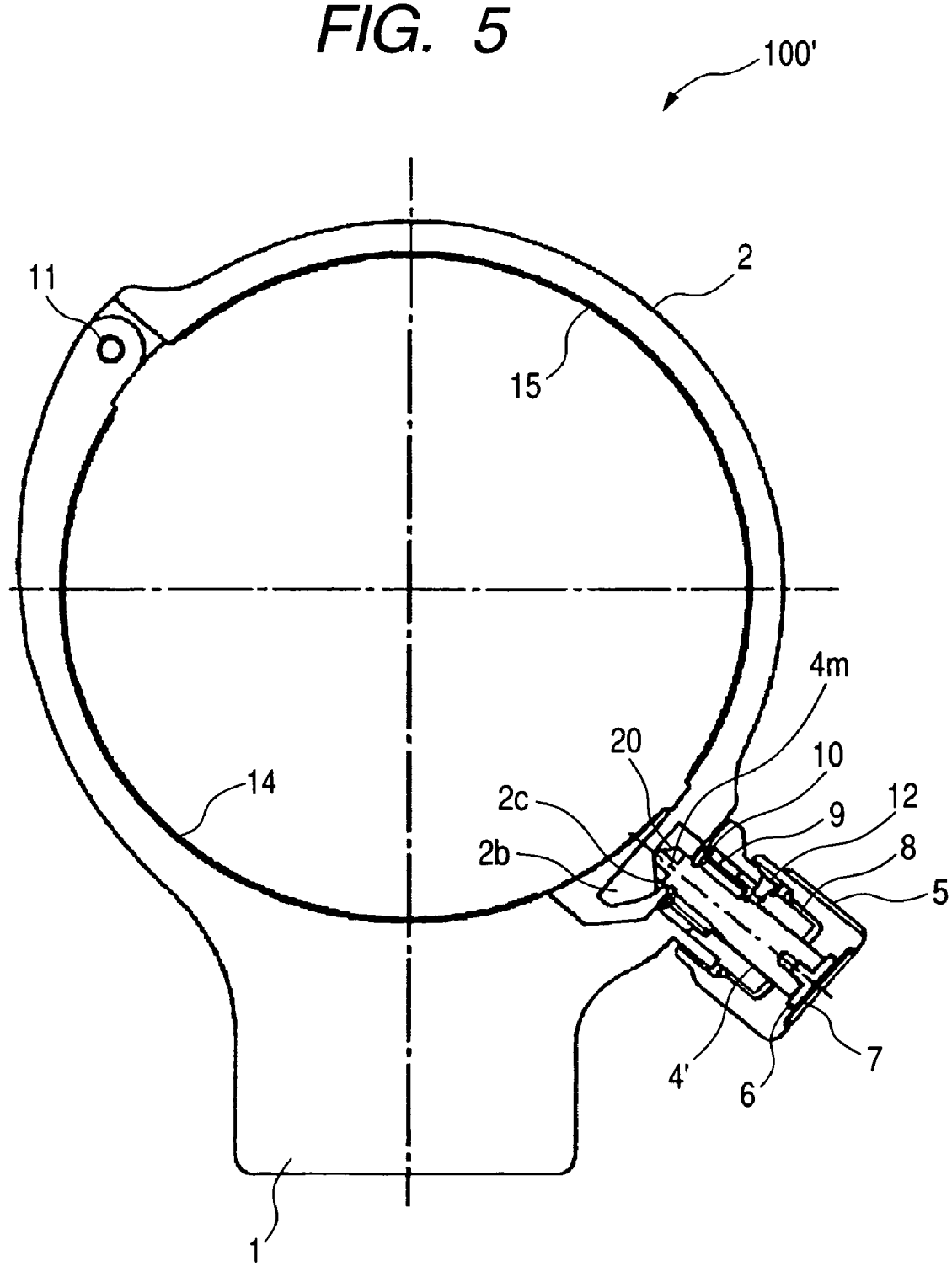
FIG. 5 is a cross sectional view showing a mounting pedestal according to second embodiment of the present invention.

FIG. 5 is a cross sectional view showing a mounting pedestal 100' as the second embodiment of the present invention. The basic parts of this embodiment are the same as those in the first embodiment, and the common parts are designated by the reference numerals same as in the first embodiment, and the description thereof will be omitted.

In the first embodiment, the conical portion 4a is integrally provided on the fastening shaft member 4. In contrast, in this second embodiment, a shaft portion 4m is formed at the tip end of a fastening shaft member (or the first member) 4', and a conical member (or the second member) 20 having a conical contact surface formed all along its circumference is attached on the outer circumference of the shaft portion 4m. The fastening shaft member 4' and the conical member 20 can be rotated relative to each other with the shaft portion 4m being the pivot.

In the above-described structure, in the state in which the contact surface of the conical member 20 is in contact with the slanted surface 2c of the engagement portion 2b of the fastening holder member 2, even when the fastening shaft member 4' is turned, rotation of the conical member 20 is prevented by virtue of friction with the slanted surface 2c. For this reason, wear of the contact surface of the slanted portion 2c and the conical member 20 is reduced as compared to the case of the first embodiment in which the conical portion 4a rotates relative to the slanted surface 2c with friction. Therefore, it is possible to realize a mounting pedestal having improved durability as compared to the first embodiment.

In the above-described embodiments, the conical portion 4a or the conical member 20 is translated toward/away from the engagement portion 2b (or the slanted surface 2c) of the fastening holder member 2 by turning the fastening shaft member 4, 4'. However, this structure may be modified in such a way that the fastening shaft member can be translated without any turning operation and the translation amount can be adjusted (or the fastening shaft member can be retained at a desired translation position). In the case of such a structure, the conical portion 4 or the conical member 20 having a conical surface all along its circumference illustrated in connection with the first and second embodiments may be eliminated, and only such an area that can be in contact with the slanted surface 2c of the fastening holder member 2 may be formed into a contact surface that is slanted with respect to the axial direction of the fastening shaft member 4, 4'.

Figure 6:
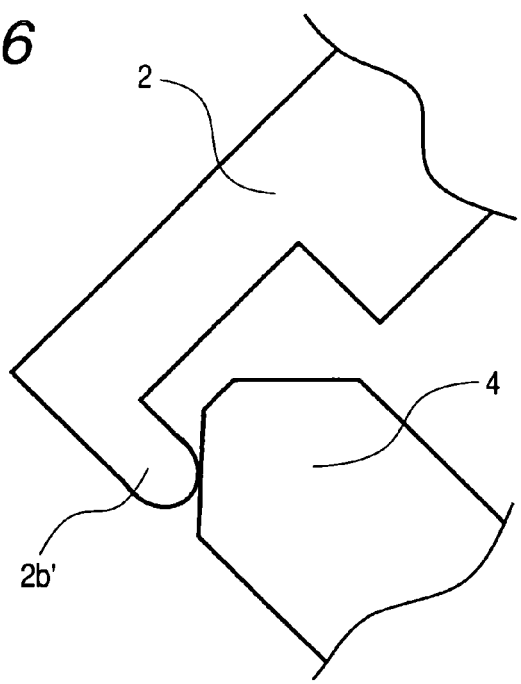
FIG. 6 illustrates a modification of the aforementioned embodiments.
Figure 7:
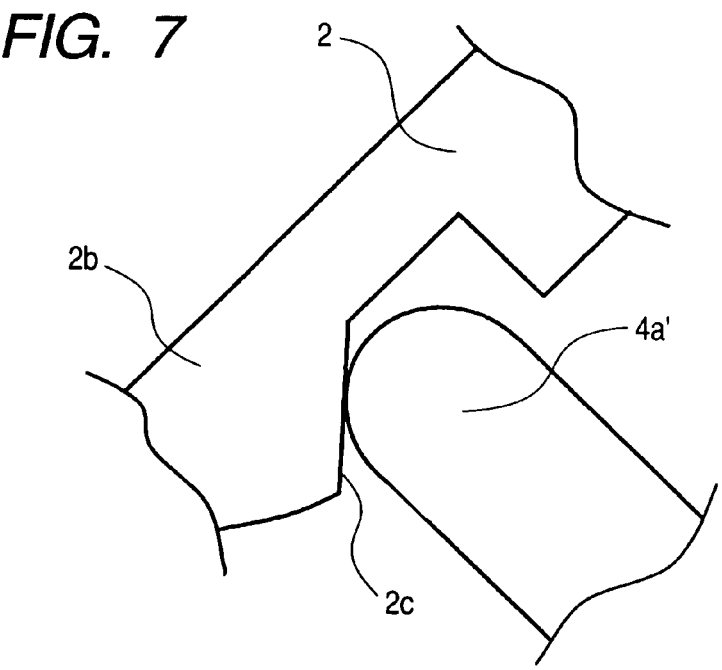
FIG. 7 illustrates another modification of the aforementioned embodiments.

Furthermore, although in the above-described embodiments, the engagement portion 2b of the fastening holder member 2 has an engagement surface (2c) that is slanted with respect to the translation direction of the fastening shaft member 4, 4', this feature is not essential to the present invention. For example, the engagement portion may be an engagement portion 2b' in the form of a projection as shown in FIG. 6. In addition, although in the above-described embodiments, a conical contact surface (4a) is provided at the tip end of the fastening shaft member 4, 4', the contact surface may be of a shape other than the conical shape. For example, it may be a contact surface 4a' having a hemispherical shape as shown in FIG. 7. In other words, at least one of the contact surface and the engagement surface should be slanted with respect to the translation direction of the fastening shaft member.

In the above embodiments, the members for holding the lens barrel (i.e. the first and second holding members) ate configured as an openable/closable two-part structure. In addition, by translating the fastening member, the contact surface and the engagement surface of the second holding member (at least one of which is slanted with respect to the translation direction) come in contact with each other to apply a lens barrel fastening force on the second holding member. Thus, according to the present invention, it is possible to realize a lens barrel holding apparatus in which the lens barrel can be easily attached and detached, the lens barrel can be held steadily without backlash, and an excessive load is not applied on the lens barrel.

Even if the contact surface and the engagement surface are worn due to their mutual sliding, an appropriate fastening force can be applied on the second holding member by adjusting the translation amount of the fastening member. Therefore, it is possible to realize a lens barrel holding apparatus having high durability against the lens barrel attaching and detaching operations.

In addition, by providing a screw engagement portion in the fastening mechanism to translate the fastening member in response to a turning operation, the fastening member can be retained, by a biasing force of a biasing member, at a contact position at which the contact surface is in contact with the engagement surface in the state in which the screw engagement portion is disengaged, and the fastening of the lens barrel is not released completely merely by loosening the screw engagement portion upon detaching the lens barrel from the apparatus. Therefore, it is possible to avoid inadvertent dropping of the lens barrel.

Furthermore, by making the contact surface movable from the aforementioned contact position in the direction away from the engagement surface in the state in which the aforementioned screw engagement portion is disengaged, the operation of pressing the portion of the second holding member on which the engagement surface is formed while moving the fastening member in the translation direction upon attaching the lens barrel and the operation of pulling the fastening member in the retraction direction upon detaching the lens barrel are made possible. Thus, the lens barrel attaching and detaching operations can be facilitated.

In addition, in the case that the fastening member has a first member adapted to translate in response to a turning operation and a second member having the aforementioned contact surface and rotatable relative to the first member, wear of the contact surface and the engagement surface due to their mutual sliding can be reduced. Thus, it is possible to realize a lens barrel holding apparatus having improved durability.

Furthermore, by providing the aforementioned contact surface all along the circumference of the fastening member, the aforementioned fastening force can be applied on the second holding member irrespective of the rotational position of the fastening member. In addition, the operation of pressing the portion of the second holding member on which the engagement surface is formed while moving the fastening member in the translation direction is made possible irrespective of the rotational position of the fastening member.

As per the above, the above embodiments can provide a lens barrel holding apparatus in which the lens barrel can be easily attached and detached, the lens barrel can be held steadily, and an excessive load is not applied on the lens barrel.

Although the above description of the embodiments has been directed mainly to a lens barrel holding apparatus (a so-called tripod or the like, the number of its legs may be one, two or more than three), the present invention may be applied to an optical apparatus including this lens barrel holding apparatus and an interchangeable lens that can be detachably mounted on a body of a single lens reflex camera as shown in FIG. 4. It is apparent that the optical system included in the optical apparatus may be an imaging optical system other than an interchangeable lens. It is also apparent that the present invention may be applied to an observation optical system (non-imaging optical system, or an optical system for making a virtual image visible to an observer) such as a telescope or a binocular. Furthermore, the present invention can be applied to an optical apparatus (such as an image pickup system or a camera system) including this lens barrel holding apparatus and an image pickup apparatus (such as a still camera or a video camera having an optical system and a lens barrel). In short, the present invention can be applied to optical apparatuses including a lens barrel holding apparatus, a lens barrel (including an imaging optical system and an observation optical system) held by the lens barrel holding apparatus and an image pickup apparatus, and it should be understood that the lens barrel holding apparatus and the lens barrel held by it shown in FIG. 4 are intended to serve merely as an illustrative example.

This application claims priority from Japanese Patent Application No. 2004-020568 filed Jan. 28, 2004, which is hereby incorporated by reference herein.

What is claimed is:

1. A lens barrel holding apparatus comprising:
   a first holding member;
   a second holding member attached to the first holding member in an openable/closable manner for fastening a lens barrel in cooperation with said first holding member to hold the lens barrel; and
   a fastening mechanism for applying a force for fastening the lens barrel, to the second holding member,
   the fastening mechanism including:
      an engagement surface provided on the second holding member; and
      a fastening member provided on the first holding member, moving straightly toward/away from the engagement surface, and having a contact surface that can be in contact with the engagement surface,
   wherein at least one of the contact surface and the engagement surface is slanted with respect to the moving direction of the fastening member.

2. An apparatus according to claim 1, wherein said fastening member is moved straightly toward/away from said engagement surface by a turning operation.

3. An apparatus according to claim 2, wherein said fastening mechanism includes a screw engagement portion for moving straightly said fastening member in response to said turning operation and a bias member for biasing the fastening member, and in the state in which engagement of the screw engagement portion is disengaged, the fastening member is retained at a contact position at which said contact surface is in contact with said engagement surface by a biasing force of the bias member.

4. An apparatus according to claim 3, wherein in the state in which engagement of said screw engagement portion is disengaged, said fastening member is movable from said contact position in the direction in which said contact surface is moved away from said engagement surface.

5. An apparatus according to claim 2, wherein said fastening member comprises a first member moving straightly in response to a turning operation and a second member having said contact surface and rotatable relative to the first member.

6. An apparatus according to claim 2, wherein said contact surface is provided all along the circumference of said fastening member.

7. An optical apparatus comprising:
   a lens barrel; and
   a lens barrel holding apparatus according to claim 1 for holding the lens barrel.

* * * * *